United States Patent [19]

Shiau et al.

[11] Patent Number: 4,536,245

[45] Date of Patent: Aug. 20, 1985

[54] LOW FORMALDEHYDE EMISSION UREA-FORMALDEHYDE RESINS CONTAINING A MELAMINE ADDITIVE

[75] Inventors: David W. Shiau, Louisville, Ky.; Eric Smith, New Albany, Ind.

[73] Assignee: Borden, Inc., Columbus, Ohio

[21] Appl. No.: 540,305

[22] Filed: Oct. 11, 1983

[51] Int. Cl.³ ............................................... C09J 5/02
[52] U.S. Cl. ............................. 156/307.3; 156/331.3; 264/128; 428/326; 428/528; 524/598; 524/843; 528/256
[58] Field of Search ................. 156/62.2, 307.3, 331.3; 264/128; 428/326, 528; 528/256; 524/598, 843

[56] References Cited

U.S. PATENT DOCUMENTS

| | | |
|---|---|---|
| 2,312,210 | 2/1943 | Dearing ............................ 524/598 |
| 2,772,197 | 11/1956 | Kozdemba . |
| 2,833,670 | 5/1958 | Roth .............................. 428/272 |
| 2,898,324 | 8/1959 | Mackay . |
| 2,947,750 | 8/1960 | Gerg . |
| 3,442,999 | 5/1969 | Konig et al. . |
| 3,629,176 | 12/1971 | Shriver ............................ 524/598 |
| 3,830,783 | 8/1974 | Vargiu et al. . |
| 3,842,039 | 10/1974 | Vargiu et al. . |
| 3,891,590 | 6/1975 | Sundie et al. . |
| 4,174,310 | 11/1979 | Hubbard ........................... 528/256 |

FOREIGN PATENT DOCUMENTS

| | | |
|---|---|---|
| 4804472 | 4/1974 | Australia . |
| 0013447 | 7/1980 | European Pat. Off. . |
| 62389 | 10/1982 | European Pat. Off. . |
| 35230 | 4/1975 | Japan . |

OTHER PUBLICATIONS

International Polymer Science, vol. 1, No. 5, pp. 60-61, (1974).
Chemical Abstracts, vol. 83, p. 63, No. 80460b (1975); Abstract of Japan Kokai No. 75-35,230.

Primary Examiner—John J. Gallagher
Attorney, Agent, or Firm—Robbins & Laramie

[57] ABSTRACT

A melamine-urea-formaldehyde resin characterized by a low rate of formaldehyde emission when cured. Made by a process where the initial reaction mixture has an F/U molar ratio of from about 3:1 to about 1:1, and undergoes a methylolation reaction at an alkaline pH. Preferably at least some of the melamine is present in the initial reaction mixture. The subsequent condensation is at a substantially neutral pH. Has a final F/U molar ratio of 1.3:1 to 0.9:1, a final F/Ueq molar ratio of 1.3:1 to 0.7:1, and a melamine content of from 0.15% to 40% by weight, dry solids basis. Useful for adhesive purposes, particularly as a particleboard binder characterized by low emission rate.

36 Claims, No Drawings

LOW FORMALDEHYDE EMISSION UREA-FORMALDEHYDE RESINS CONTAINING A MELAMINE ADDITIVE

BACKGROUND OF THE INVENTION

This invention relates to urea-formaldehyde resins modified with melamine. Upon curing, these resins are characterized by low formaldehyde emission. The invention also relates to processes for preparing these resins, and to particleboard and other composites made using these resins as binders.

Urea-formaldehyde resins are widely used in industry as adhesives, particularly as binders for particleboard and other composites made from small pieces of wood. Urea-formaldehyde (UF) resins have the advantages of low costs, rapid cure, processing convenience, and clear color. As employed in the manufacture of composite board products, very short press cycles can be achieved with urea-formaldehyde adhesives. By adding a catalyst to a UF resin, the rate of cure can be adjusted to essentially any desired speed.

One disadvantage of the UF resins is the emission of formaldehyde fumes, both during production processes and, over a period of time, from the finished products. Particleboard and other composite panels made with UF resin binders contain cured resin films that have very large surface areas, which appear to enhance formaldehyde release.

The causes for formaldehyde release are complex. From the curable resin composition itself, free unreacted formaldehyde may evolve. When a resin is used as the binder for a composite panel, the formaldehyde may dissolve in moisture in the wood pieces, and its vapor pressure and its release rate may change with changes in air humidity and in product humidity. In particleboard, formaldehyde emissions can come from formaldehyde which was bound to wood cellulose during the hot press cycle, but which may slowly hydrolyze under the influence of acidic humidity in the wood. It may also result from the degradation of incompletely cured resin or resin components such as methylolurea.

Conventional cured UF resins may contain methylol, methylene ether, and other reaction products which possibly hydrolyze back to formaldehyde. The weakest links are in the cellulose-resin linkage, the hemiacetals, ethers, and methylols. The oxygen-free methylene linkage is the most resistant to hydrolysis, and, after assuming a hydrolysis mechanism, recent attempts to limit or eliminate formaldehyde release have sought to increase methylene linkages as compared with other group linkages in the resin.

Other paths have been explored over the last few years for reducing formaldehyde release. These include coating applications, chemical treatments before or after resin application, the use of resin additives, and new resin formulations. In such new resin formulations, the mole ratio of formaldehyde to urea has been slowly decreased over the years, but reductions in this ratio generally have tended to weaken the internal bond in particleboard, even though reducing residual formaldehyde and formaldehyde emission.

The copending patent applications of James H. Williams, Ser. Nos. 416,573 and 416,574, both filed Sept. 10, 1982, now U.S. Pat. No. 4,410,685, issued Oct. 18, 1983, and U.S. Pat. No. 4,409,293, issued Oct. 11, 1983, respectively, are concerned respectively with a new UF resin formulation that is hydrolytically stable and with particleboard made from this new resin. The resin itself is a UF liquid base resin having a UF mole ratio of substantially 1:1. This resin contains essentially no free formaldehyde. When cured, it contains substantially more methylene groups than methylene ether groups. These applications also disclose processes for preparing the resin, and processes for using it as a particleboard binder. Both of these applications are expressly incorporated herein by reference.

SUMMARY OF THE INVENTION

Melamine-urea-formaldehyde resins have been developed that are especially useful as particleboard binders, and that are characterized by low formaldehyde emission. Processes for making these resins and for using them in the production of particleboard, and the finished particleboard itself, are all within the scope of the invention.

A melamine-urea-formaldehyde resin composition in accordance with the invention is characterized by a low rate of formaldehyde emission in the curable state and also when fully cured. Such a composition comprises, in combination, a melamine-urea-formaldehyde condensate that has a final molar ratio of formaldehyde to urea of 1.3:1 to 0.9:1, a final molar ratio of formaldehyde to urea-equivalent of 1.3:1 to 0.7:1, and a solid melamine crystal content of from about 0.1% to about 26% by weight of said condensate, liquid basis at 65% solids, preferably together with an amount of a scavenger substance. Expressed on a dry solids basis, the melamine component is from about 0.15% to about 40% by weight. The condensate desirably is formed from an initial reduction mixture having a molar ratio of formaldehyde to urea of from about 2.2:1 to about 2.0:1, when the resin is to be used as a binder for particleboard. In addition, the initial reaction mixture preferably includes at least some of the melamine.

The urea-equivalent value is equal to the total number of equivalents of reactive amine groups available, divided by 2. The scavenger may be a material such as urea that is added to the preformed condensate over and above that amount that would otherwise be used for optimum physical properties, or a scavenger-catalyst that is incorporated in the composition, such as ammonium sulphate or other ammonium salt, a hydrazine, or a semicarbazide, or a combination of these.

When the term "urea" is used herein in connection with a molar ratio, the reference is to urea per se. When the reference is to urea-equivalent, the reference is to the total number of all reactive amine equivalents whether present on molecules of urea, melamine, or other nitrogenous material, divided by two.

The process of making resins in accordance with the invention involves a two stage reaction. In the first, methylolation stage, urea and formaldehyde, and preferably melamine, are formed into a liquid reaction mixture at an alkaline pH, generally above pH 8, and are reacted. The reaction mixture is then adjusted to a generally neutral pH, i.e. pH 6.0-8.3, the remaining urea is added, and condensation is caused to occur. Any balance of melamine to be added should be added at the beginning of the condensation reaction. Preferably a scavenger substance is added to the liquid resin composition prior to curing. For storage stability, the liquid resin composition is adjusted to a high pH, above 7.0, preferably above 9.0, and more preferably, at or above pH 9.4.

When used as a binder for particleboard or other composite, the resin composition ordinarily will be present in an aqueous vehicle, generally having a solids content of from about 45% to about 70% by weight, and preferably from 60% to 70% by weight, and a viscosity in the range from about 60 to about 800 cps as determined on a Brookfield RVF viscometer using a No. 2 plate at 20 rpm at 25° C. Application is made at the usual rate for a commercial UF resin, or somewhat higher.

Composite boards can be made using such binders that are characterized by internal bond strengths comparable to those obtained with the urea-formaldehyde resins currently in commercial use. However, the rate of formaldehyde emission is very much lower.

DETAILED DESCRIPTION OF THE INVENTION

Resins made in accordance with the present invention utilize melamine's 3-dimensional cross-linking capability. This results in the production of stable, durable resins that may be prepared with unusually low final mole ratios of formaldehyde to urea equivalent, at about or below 1.30:1, but not below about 0.7:1. Generally, urea equivalent is calculated by determining the moles of urea used, and adding to that value 1.5 times the moles of melamine used. The final mole ratio of formaldehyde to urea equivalent appears to be important because this ratio seems to be the predominant, and possibly the only, important factor controlling the emission rate of formaldehyde as determined by the two hour desiccator test of the National Particleboard Association.

For comparative purposes, commercially available phenolic resin particleboard binders generally are considered to exhibit formaldehyde emission levels of from about 0.1 ppm to about 0.5 ppm. When measured in the laboratory by the two hour dessicator test, the levels are generally from 0.1 to 0.3 ppm, and when measured at the mill by the same technique, from 0.4 ppm to 0.5 ppm. The term "ppm" is generally used here, as is common in the art, to refer to the results obtained from the two hour dessicator test of the National Particleboard Association, Test FTM-1 of Aug. 1, 1982, as revised May 18, 1983. More correctly, the results could be referred to in micrograms per ml.

For convenience hereafter in referring to molar ratios, the letters F, U, and M may be used as abbreviations respectively for formaldehyde, urea and melamine. The abbreviation Ueq is used for urea equivalent. In some cases, "mel." is used for melamine, and "am." for ammonium.

Resins according to the invention are usually prepared by a two stage process. In the first stage, all of the formaldehyde and a part of the urea, and all or a part of the melamine, are reacted at an alkaline pH, in a methylolation reaction. The F/U molar ratio for this first stage is referred to as the initial F/U mole ratio. The second stage of the reaction is usually at a substantially neutral pH, i.e. pH 6.0–8.3, and polymerization occurs. After the second stage reaction, the remainder of the urea is usually added, together with any additional melamine desired.

Generally, the initial reaction mixture for the first stage of reaction includes at least a part of the melamine that is to be used, together with formaldehyde, urea, and water, at an F/U molar ratio of from 3:1 to 1:1. After a methylolation reaction, at an alkaline pH, generally at or above pH 8, the reaction mixture is subjected to conditions to cause condensation to occur, at a substantially netural pH. The balance of the urea, and any balance of melamine are added. The final F/U mole ratio is from 1.3:1 to 0.9:1; the final F/Ueq mole ratio is from 1.3:1 to 0.7:1, and the melamine component is from 0.15% to 40% by weight of the condensate, dry solids basis.

The minimum amount of melamine that is used is determined by a balance of several factors, including the bond strength that is required, cost, and the target level for formaldehyde emission. The amount of melamine may be as low as 0.15%, or as high as 40%, based on the weight of the condensate, dry solids basis. For particleboard binders, the melamine content may generally be from 0.15% to 12%, based on the weight of the condensate, dry solids basis, and preferably is from 3% to 6%.

It is preferred to add the melamine to be a part of the initial reaction mixture. When the amount of melamine is added in two stages, however, better storage stability may be obtained at the melamine content levels preferred for use in particleboard binder formulations.

Resins according to the invention that are intended for use as particleboard binders are prepared to have an initial F/U mole ratio of 2.2:1 to 2.0:1, a final F/U mole ratio of 1.3:1 to 0.9:1, a final F/Ueq mole ratio of 1.3:1 to 0.7:1, and a melamine content of from 1% to 15% on liquid resin (based on 65% solids in the liquid resin). A preferred F/Ueq molar ratio range is from 1.03:1 to 0.82:1, for particleboard binder applications.

Despite their low F/Ueq molar ratios, these resins can be used as binders that produce satisfactory internal bond strengths in particleboard. This is somewhat surprising because commercially available urea formaldehyde resins often tend to produce commercially unsatisfactory bond strengths at or below an F/U molar ratio of 1.0:1. The incorporation of melamine appears to overcome the deficiency in internal bond strength while at the same time permitting a low ratio of formaldehyde to urea equivalent, thus leading to a low emission rate.

Even with a mole ratio of F/Ueq (urea equivalent) as low as 1.03:1, some formaldehyde vapor is generated upon curing, such as that which would occur in the production of particleboard during hot pressing. Accordingly, resin compositions in accordance with the invention may include not only the resin itself, but also a scavenger substance in an amount that, in the cured resin, reduces formaldehyde emission. The scavenger substance may be an ammonium salt such as, for example, ammonium sulphate, or it may simply be a scavenger substance such as urea that is added to the preformed condensate over and above the amount required for desired physical properties. When added urea is used, generally it is added following the second stage polymerization step, in an amount from about 5% to about 15%, and preferably about 10%, by weight of the liquid resin (65% solids).

Other scavenger substances that may be used include other ammonium salts such as the chloride, bromide and thiosulfate; sodium thiosulfate or sulfite; primary and secondary amine hydrochlorides such as hydroxylamine hydrochloride, n-butylamine hydrochloride, dibutyl amine hydrochloride, and ethanolamine hydrochloride; and hydrazine sulfate. Some scavenger substances, such as the ammonium salts, also function as accelerators or curing agents for the urea-formaldehyde reactions.

As the mole ratio of F/Ueq is decreased from about 1.3 down to about 0.7, which is an exceptionally low ratio, generally progressively decreasing amounts of free formaldehyde are observed. Thus, at the very low mole ratio values of F/Ueq of 0.7:1 to 0.8:1, while a curing agent may be desirable, even in the absence of a curing agent, a stable bond can be obtained, and emissions are substantially reduced. However, other properties may be affected so that the presence of a curing agent generally tends to be desirable.

The basic chemistry involved in the present invention can be described as follows. It is possible to write speculative structural formulas for UF liquid resins with F/U mole ratios at or below 1.0:1, as follows (U=urea; F=—CH$_2$— or —CH$_2$OCH$_2$—):

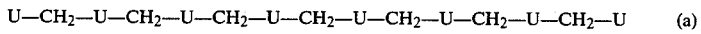  (a)

(a urea-terminated polymethylene urea)   F/U = 0.9:1

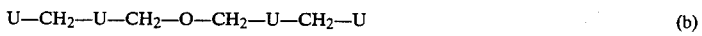  (b)

(a urea-terminated methylene/methylene ether-urea oligomer)  F/U = 0.8:1

No data is available as to the relative abundance of (a) or (b), or other types of structure; it probably is not important. However, such resins may have limited capacity to cross-link further between chains to form a stable, three-dimensional network, which is necessary for good resin performance. Similar liquid MUF resins would have structures that could be represented, at least in part, as follows:

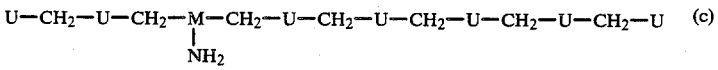  (c)

[urea-terminated polymethylene (urea, melamine)],
F/Ueq = 0.9:1

  (d)

(urea-terminated methylene/methylene ether)
F/U + M = 1.0:1, and,

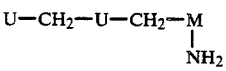

(di-methylene urea, melamine) F/U + M = 0.66:1

The available —NH$_2$ functionality, arising from melamine, would be available to form cross-links with formaldehyde, on curing.

The —NH$_2$ groups should also be available to form organometallic coordination complexes with certain salts which may be used as internal catalysts, such as magnesium chloride:

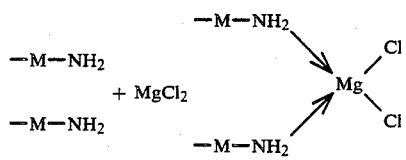

Such linkages could act as a partial replacement for formaldehydegenerated cross-links. There is some evidence that, at F/U=0.70:1, internal bond strengths (IB's) are better in the presence of 0.5-2.0 parts of magnesium chloride, than in its absence. This has only been observed when the F/U is significantly below 1.0:1.

Resins having the compositions of the invention may be used in dry powered form, but more frequently are applied as aqueous solutions. When applied to particleboard furnish at the rate of about 6% to about 9% or more by weight of the furnish, dry basis, and hot pressed at about 350° F. for several minutes, good internal bond strengths may be achieved. The compositions can be formulated to have reasonable storage lives, particularly if the pH is above about 7.0, and preferably, above 7.7, and most preferably, about pH 9.0 to 9.5 (for 8% melamine based on liquid resin at 65% solids.

To prepare a resin according to the invention useful as a particleboard adhesive, according to one preferred mode, formaldehyde is charged to a reactor. While the formaldehyde may be at any convenient concentration, it is preferred to use a 50% concentration formaldehyde. Generally this means that the actual concentration is in the range from about 49.8% to about 50.2%. Once in the reactor, the pH is adjusted to an essentially neutral value, that is, 7.0 to 7.2, by adding a basic material. A preferred such material is triethanolamine.

Urea is then added rapidly. Preferably, the amount of urea added is sufficient so that the initial F/U molar ratio is from about 2.2:1 to about 2.0:1. After the urea has dissolved, melamine is added rapidly, with agitation. The additions of urea and of melamine raise the pH. The desired amount of water is added, then the batch is heated to reflux. After the melamine is dissolved, which generally occurs at 60°-76° C., heating at reflux is continued for a period of time to permit methylolation to occur. The batch is then cooled to 70° to 74° C., and the pH is adjusted with 30% formic acid or the like, to a substantially neutral pH of 6.0 to 8.3, for polymerization (condensation) to take place, and preferably to pH 7.0 to 7.2.

The materials are reacted at an elevated temperature, often about 70° C. to 86° C., until a target Gardner viscosity is reached. As the desired viscosity is approached, the temperature is permitted to drop to lower values, generally from 4° to 6° C. below the initial reaction temperature. As soon as the target viscosity has been reached, the batch is cooled to about 50° to 54° C., and the pH is adjusted to 7.3 to 7.7 by adding a basic-reacting material, preferably triethylamine.

Sodium chloride is then added, then the F/U molar ratio is adjusted by the addition of more urea, until the desired final molar ratio of F/Ueq is attained. An internal curing agent such as magnesium chloride may be added with the urea and salt, or after they have dissolved, if one is to be used.

To use the batch of material, it is preferably at a solids content in the range from about 45% to about 70%, and preferably, 60% to 70%. For optimum stability during storage, the pH is adjusted to at least 7.7 or higher, and preferably, to 9.0 or higher. A most preferred value is a pH of about 9.4, for good storage stability (at 8% melamine content based on liquid resin at 65% solids).

Prior to use, preferably a scavenger substance is incorporated with the resin. The scavenger substance may be an additional amount of urea, such as from about 7.5% to about 15% by weight of the liquid resin (65% solids). Other amine-reactive compounds could be used in place of urea, but urea is preferred. The scavenger substance could also be a scavenger-curing agent, of which one preferred example is ammonium sulphate. The scavenger substance serves multiple purposes. Its primary function is to reduce the amount of formaldehyde emission from the cured resin. It may also reduce the free formaldehyde in the resin composition prior to curing. It also must not have a deleterious effect on internal bond strength, and it must not raise the cost unduly.

In the dry form, the resin may be sprinkled on furnish for the production of a composite board such as particleboard. Preferably, however, the resin remains as produced, in solution in an aqueous vehicle, and in this form it is sprayed on the furnish in the requisite amount. The resin can also be formulated as a general purpose industrial adhesive.

The invention will be exemplified by the following demonstrations of the invention. In these demonstrations of the invention, as elsewhere in the specification, all temperatures are in degrees Celsius, and all parts are parts by weight, unless expressly stated to be otherwise. Viscosities reported in centipoises (cps) are as measured on a Brookfield RVF viscometer using a No. 2 plate at 20 rpm and 25° C., unless otherwise specified.

EXAMPLE 1

UF Resin Modified by 4% Melamine Added at Two Different Stages

A reaction vessel was charged with 2536.9 g. of 50% formaldehyde, 7.0 g. of triethanolamine, and 1153.1 g. of urea. After mixing and dissolution, the pH was 7.3. 104.1 g. of melamine and 37.0 g. of water were added. The mixture was stirred thoroughly to insure complete dissolution of the melamine. Upon completion of the addition and dissolution, the pH was 7.5. The mixture was then heated at reflux for 10 minutes.

The pH was then adjusted to within the range 6.1 to 6.2 by the addition of 3.6 g. of 30% formic acid. The temperature was allowed to drop to 84° to 86° C. This temperature was maintained to a Gardner viscosity of N.

The pH was then adjusted to about 7.4 by the addition of 3.2 g. of triethylamine. 104.1 g. of melamine was then rapidly added, and the reaction mixture was stirred for 10 minutes at 54° C. to 58° C.

At this point, 101.4 g of common salt (sodium chloride), 1368.5 g. of urea, and 0.5 g. of triethylamine were added. The product thus obtained was an aqueous solution of a melamine-modified urea-formaldehyde resin, or more accurately, a melamine-urea-formaldehyde resin.

During the first stage of the reaction, the initial F/U molar ratio was 2.2:1. The final F/U molar ratio was 1.01:1, and the final F/Ueq ratio, i.e., F/(U+1.5M) was 0.95:1. The recovered product amounted to 5406 g. The total amount of melamine used was 3.9% based on recovered liquid resin (i.e., the 5,406 g. of recovered product), and about 5.5% dry solids basis (dsb) based on urea plus formaldehyde.

This demonstration of the invention was repeated for a total of three runs, identified hereafter as demonstrations 1A, 1B and 1C, respectively. The physical properties of the three different resin solutions obtained are reported in Table 1-1 below:

TABLE 1-1

| Physical Properties of the Resin Compositions of Demonstrations 1A, 1B and 1C | | | |
|---|---|---|---|
| | 1A | 1B | 1C |
| pH @ 25° C. | 8.0 | 8.2 | 8.0 |
| Viscosity, cps (RVF 1/20/25° C.) | 168 | 156 | 158 |
| Sp. Gravity (25/25° C.) | 1.282 | 1.279 | 1.280 |
| Gel Time, G.E. (121° C.) (minutes) | 15.3 | 15.7 | 14.1 |
| Total Solids, % | 66.5 | 64.7 | 64.6 |
| BWG Time, sec. (100° C.) | — | >180 sec. (3 parts Ammonium Sulfate) | 70 sec. (combination of 1.5 parts Ammonium Sulfate and and 4.0 parts Aluminum Sulfate) |

These resin compositions were mixed with curing agents or scavenger/curing agents for particleboard manufacture. The results are summarized in Table 1-2 below. The weight of curing agent employed is calculated on the weight of liquid resin (at 65% solids). The percentage by weight of resin composition applied to the furnish is reported as resin solids applied as a percentage of furnish solids, dry basis, under the subheading, "Percent Mix Application". The percent reduction in emission as compared to a control is based on a comparison with a commercially available urea-formaldehyde resin employed in essentially the same way and subjected to essentially the same conditions as the resin of the invention. The reduction refers to formaldehyde emission occurring after storage of the particleboard for 2-5 days.

Wherever there is reference hereafter to emission reduction compared to a control, the comparison is with the same commercial urea-formaldehyde resin referrred to in Table 1-2 as the control, and the test conditions used for the control resin will be the same as those for the resin compositions of the invention that are being evaluated.

Upon formulation and evaluation as particleboard binders, the following observations were made.

TABLE 1-2

| | | | Evaluations as Particleboard Binders | | | |
|---|---|---|---|---|---|---|
| | | | | Emission | Internal Bond Strength (I.B.) | |
| Resin | Curing Agent/ (Parts/ 100 pts resin) | % Mix Application (cure temp.) | ppm | % Reduction Compared to Control | Original 3.75 min./ 340 or 360° (24 hr. tests) | Storage Life (days) to 30 cps/day max. |
| 1A | Citric Acid (2.4) | 8 | 0.6 | 67% | 165 | RT: 82 days |
| | Am. Chloride (4.0) | 8 | 0.2 | 90% | 113 | 90°: N/A |
| 1B | Am. Sulfate(0) (1.5) (3.0) (4.0) | 8 (340°) | 0.4 0.3 0.25 0.2 | 60% 70% | 140 130 120 112 | RT: 76 days+ 90°: 21 days |
| 1C | Am. Sulfate(0) (0.8) (1.5) | 8 (360°) | 0.3 0.2 0.2 | ~70% | 137 (130,135) 136 (129,131) 129 (115,140) | N/A |

In Table 1-2, the percentage of catalyst is reported on liquid resin (65% solids); this same basis is used throughout these examples.

In more detail, the evaluation data for some of these product compositions is as reported in Table 1-3, below:

TABLE 1-3

| | Evaluations as Particleboard Binders | | | | | |
|---|---|---|---|---|---|---|
| Resin used | 1A | | 1A | | 1A | |
| Resin Mix Application | 8.0 | | 8.0 | | 8.0 | |
| Curing Agent Used (20% soln) | Citric Acid | | Am. Chloride | | Am. Chloride | |
| Wt. % Curing Agent Used (wt/wt) | 12.0 | | 12.5 (4.0) | | 22.2 (8.0) | |
| Press Time (340° F.), minutes | 3.75 | 3.00 | 3.75 | 3.00 | 3.75 | 3.00 |
| Residual Formaldehyde (2 Hr) | 0.6 | 0.6 | 0.2 | 0.3 | 0.2 | 0.3 |
| μg/ml Desiccator Value | — | — | 0.1 | — | — | — |
| μg/ml Desiccator Control (75° F./54% RH) | | | | | | |
| Internal Bond, psi Original | 165 | 167 | 113 | 103 | 75 | 61 |
| 24 Hr @ 150° F. | 123 | — | — | — | — | — |
| 24 Hr @ 120° F./ 70% RH | 137 | — | — | — | — | — |

TABLE 1-4

| | Evaluation as Particleboard Binders | | | | | | | |
|---|---|---|---|---|---|---|---|---|
| Resin used | 1B-1 | | 1B-2 | | 1B-3 | | 1B | |
| Resin Mix Application | 8.0 | | 8.0 | | 8.0 | | 8.0 | |
| Curing Agent Used (20% soln) | None | | Am. Sulfate | | Am. Sulfate | | Am. Sulfate | |
| Wt. % Curing Agent Used (wt/wt) | — | | 7.0 (1.5) | | 13.0 (3.0) | | 16.7 (4.0) | |
| Press time (340° F.), minutes | 3.75 | 3.00 | 3.75 | 3.00 | 3.75 | 3.00 | 3.75 | 3.00 |

TABLE 1-4-continued

| | Evaluation as Particleboard Binders | | | | | | | |
|---|---|---|---|---|---|---|---|---|
| Resin used | 1B-1 | | 1B-2 | | 1B-3 | | 1B | |
| Residual | 0.4 | 0.4 | 0.3 | 0.3 | 0.25 | 0.2 | 0.2 | 0.2 |
| Formaldehyde (2 Hr) μg/ml Desiccator Value | | | | | | | | |
| μg/ml Desiccator Control (72° F./58% RH) | — | — | — | — | — | — | — | — |
| Internal Bond, psi Original | 141 | 110 | 129 | 110 | 117 | 108 | 112 | 118 |
| 24 Hr @ 150° F. | 117 | — | 117 | — | — | — | — | — |
| 24 Hr @ 120° F./ 70% RH | 129 | — | 113 | — | — | — | — | — |

EXAMPLE 2A

UF Resin Modified by 4% Melamine Added in a Single Stage

In this demonstration of the invention, the process is generally similar to that used in Example 1, except that all of the melamine was added at once, during the methylolation stage of the urea-formaldehyde reaction.

Thus, the reactor was charged with a 50% formaldehyde solution, 2541.8 g.; triethanolamine 5.0 g.; and urea, 1270.9 g. When the urea was completely dissolved, the pH was 7.5. 224.0 g. of melamine and 150.0 g. of water were added, to increase the pH to 7.8. This mixture was stirred and heated to reflux, then heated at reflux for 10 minutes. The pH was then adjusted to about 6.3 with 3.3 g. of 30% formic acid. The reaction mixture was then heated at 81°–83° C. to achieve a Gardner viscosity of N/O.

After reaching the desired viscosity, 3.6 g. of triethylamine and 110.0 g. of salt were added, then 1563.3 g. of urea, and 25.0 g. of magnesium chloride hexahydrate. The recovered product amounted to 5883 g., and is designated 2A.

The initial F/U molar ratio was 2.0:1. The final F/U molar ratio was 0.90:1. The final F/Ueq molar ratio was 0.85:1.

EXAMPLE 2B

A generally similar procedure was followed, to make a resin similar to that described above but containing ammonium chloride as a catalyst for the condensation reaction. The initial F/U ratio was 2.00:1; the final F/U ratio was 0.90:1; and the final F/Ueq was 0.85:1.

To make this resin 2B, a reactor was charged with 1525.1 g. of 50% formaldehyde, 4.0 g. of triethanolamine, and 762.5 g. of urea, to achieve pH 7.5 on dissolution. Then 134.4 g. of melamine and 90.0 g. of water were added with agitation and heating to reach pH 7.7 upon dissolution of the melamine. After 10 minutes at reflux, 1.0 g. of ammonium chloride were added, to attain a pH of 6.1–6.3. The mixture was then heated at 74°–78° C. to a Gardner viscosity of N/O, with a slight reduction in temperature as the target viscosity approached.

Then 2.2 g. of triethylamine, 66.0 g. of salt, 938.0 g. of urea, and 16.0 g. of MgCl$_2$ were added. The recovered liquid resin product amounted to 3524 g.

The physical properties of the two liquid resin products, 2A and 2B, are reported in Table 2-1 below.

Upon formation and evaluation of the 2B resin, as a particleboard binder, it appeared that best results were obtained without any external catalyst, and that satisfactory internal bond values and emission levels were attained.

F/U ratio was 1.01:1, and the final F/Ueq ratio was 0.95:1. The process employed is quite similar to those of Examples 2. Thus, the reactor was charged with 2640.5 g. of a 50% formaldehyde solution, 5.6 g. of triethanolamine, and 1200.2 g. of urea. Upon complete dissolution of the urea, the pH was 7.5. As soon as the urea was dissolved, 216.8 of melamine and 60.0 g. of water were added, with stirring and heating, to obtain complete dissolution of the melamine. The pH was then recorded to be 7.7.

The reaction mixture was heated to reflux and held at reflux for 10 minutes. The pH was then adjusted to about 6.6 by the addition of 3.8 g. of 30% formic acid. The reaction mixture was then heated at 82°–84° C. to attain a Gardner N viscosity. At that point, 3.9 g. of triethylamine, 105.2 g. of salt, and 1424.4 g. of urea were added. This permitted recovery of 5646 g. of product. The physical properties of the product are reported in Table 3-1 below:

TABLE 3-1

| Physical Properties | |
|---|---|
| pH @ 25° C. | 8.3 |
| Viscosity (RVF 1/20/25° C.) | 141 cps |
| Sp. Gravity (25/25° C.) | 1.281 |
| Gel Time, G.E. (121° C.) | 13.9 minutes |
| Total Solids | 64.6% |
| BWG Time, (100° C.) | 62 sec. (comb. of 1.5 parts Ammonium Sulfate and 1.5 parts Aluminum Sulfate) |

TABLE 2-1

Physical Properties of the Products 2A and 2B

| | 2A | 2B |
|---|---|---|
| pH @ 25° C. | 8.2 | 8.1 |
| Viscosity (RVF, 1/20/25° C.) | 120 cps | 118 cps |
| Sp. Gravity (25/25° C.) | 1.280 | 1.279 |
| Gel Time, G.E. (121° C.) | 14.7 minutes | 11.3 minutes |
| Total Solids | 64.8% | 64.4% |
| BWG Time, (100° C.) | >180 sec. (1.5 parts Ammonium Sulfate) 67 sec. (Comb. of 1.5 parts Ammonium Sulfate and 3.0 parts Aluminum Sulfate) | 60 sec. (combination of 1.5 parts Ammonium Sulfate and 3.0 parts Al Sulfate |

The resin compositions were evaluated as particleboard binders, using several different formulations. The results are summarized in Table 2-2 below:

TABLE 2-2

Evaluations as Particleboard Binder

| Formulations | Ammonium Sulfate Curing Agent (parts 100 pts liquid resin [65% solids]) | % Mix Application (cure temp. °F.) | Emission ppm | % Reduction Compared to Control | I.B. - Original 3.75 min./ 340 or 360° (24 hr. tests) |
|---|---|---|---|---|---|
| 2A-1 | (0) | 8 (340°) | 0.2 | 70% | 132 |
| 2A-2 | (1.5) | 8 (340°) | 0.1 | 85% | 115 |
| 2A-3 | (3.0) | 8 (340°) | 0.1 | 85% | 124 |
| 2A-4 | (4.0) | 8 (340°) | 0.1 | 85% | 113 |
| 2B-1 | (0) | 7 (360°) | 0.1 | 92% | 146 |
| 2B-2 | (0.75) | 7 (360°) | 0.1 | 92% | 143 |
| 2B-3 | (1.5) | 7 (360°) | 0.1 | 92% | 119 |

EXAMPLE 3

Melamine-Urea-Formaldehyde Resin Containing 4% by Weight Melamine, with the Melamine Added in One Stage In this demonstration of the invention, the molar ratios are slightly different from those of the resins in Ex. 2. That is, the initial F/U ratio was 2.20:1, the final The resin product of this example, Resin 3, was then evaluated as a particleboard binder in comparison with the control urea formaldehyde resin. The data obtained through the comparison is reported in Table 3-2 below.

TABLE 3-2

| | Evaluation as Particleboard Binder | | | |
|---|---|---|---|---|
| Formulation | 3A | 3B | 3C | 3D |
| Resin Mix Application (parts resin solids/100 parts furnish, dry basis) | 7.0 | 7.0 | 7.0 | 7.0 |
| Curing Agent Used (20% soln) | None | Am. Sulfate | Am. Sulfate | Am. Sulfate/ Al Sulfate (30% sol.) |
| Wt. % Catalyst Used (as is) | — | 3.6 | 7.0 | 7.0/4.8 |
| Press Time (360° F.) | 5.5   3.75 | 5.5   3.75 | 5.5   3.75 | 5.5   3.75 |
| Residual Formaldehyde (2 Hr.) μg/ml Dessicator Value | 0.21   0.30 | 0.20   0.24 | 0.15   0.18 | 0.3   0.3 |
| μg/ml Dessicator Control | | | | 0.04 am   0.02 pm |
| Internal Bond, psi Original | 123   126 | 76   120 | 139   133 | 107   98 |
| 48 Hr @ 150° F. | 121   121 | 79   92 | 124   118 | 100   79 |
| 48 Hr @ 120° F./ 70% RH | 92   113 | 72   102 | 122   134 | 82   77 |

EXAMPLE 4A

Production of a General Purpose Adhesive from an MUF Resin

This example illustrates the production of an MUF resin containing 1% melamine added in a single stage. Upon evaluation, it generated internal bond strengths in particleboard, when used as a binder, that were not satisfactory. However, in less demanding adhesive applications, it would be adequate.

The reactor was charged with 2446.0 g. of 50% formaldehyde solution, 3.7 g. of triethanolamine, and 1287.4 g. of urea. When the urea had completely dissolved, the pH was 7.5. Then 50.4 g. of melamine were added with maximum agitation and heating. After complete dissolution of the melamine, the pH was 7.6. Heat was continued to reflux, and reflux was maintained for 15 minutes. At that time, cooling was begun and the pH was adjusted to 6.0 to 6.1 by the addition of 1.9 g. of 30% formic acid. Heating was then continued at 86°-88° C. until a Gardner viscosity of M/N had been achieved. At that time, 1.9 g. of triethylamine were added to adjust the pH to 7.5. The product was then vacuum concentrated to obtain a specific gravity 1.253.

100 g. of salt were then added, and 1158.6 g. of urea. After complete dissolution of these materials, the yield of product, Resin 4A, was 4929 g. The physical properties of the product are reported below in Table 4-1.

TABLE 4-1

| Physical Properties of Resin 4A | |
|---|---|
| pH @ 25° C. | 7.8 |
| Viscosity (RVF 1/20/25° C.) | 227 cps |
| Sp. Gravity (25/25° C.) | 1.286 |
| Gel Time, G.E. (121° C.) | 10.5 minutes |

TABLE 4-1-continued

| Physical Properties of Resin 4A | |
|---|---|
| Total Solids | 65.6% |
| BWG Time (100° C.) | 105 seconds (0.3 parts citric acid) |
| Storage Stability (room temperature 72-77°F., viscosity reading, cps/days) | |
| 227/0 | 281/6 |
| 350/30 | 766/44 |

For this product the initial F/U molar ratio was 1.90:1; the final F/U molar ratio was 1.00:1; and the final F/U equivalent molar ratio was 0.99:1.

EXAMPLE 4B

A similar experiment was conducted using the same ratios specified in the preceding paragraph and the same general production process, modified however in that 1% dicyandiamide was one of the components added initially to the reactor, in addition to the 1% melamine, and vacuum concentration was omitted. This liquid resin product is identified as resin 4B.

With resin 4A, the formaldehyde emission under particleboard pressing conditions was 0.6-0.8 ppm, a 50% reduction as compared to the control U/F resin. The comparable figures for resin 4B were 0.65 ppm and 55% reduction.

Upon evaluation of resin 4B as a particleboard binder, cured with citric acid, it was concluded that the resin performed well. The physical properties of resin 4B are reported in Table 4-2 below.

TABLE 4-2

| Physical Properties of Resin 4B | |
|---|---|
| pH @ 25° C. | 8.0 |
| Viscosity (RVF, 1/20/25° C.) | 168 cps |
| Sp. Gravity (25/25° C.) | 1.277 |
| Gel Time, G.E. (121° C.) | 13.7 minutes |
| Total Solids | 64.8% |
| BWG Time (100° C.) | 70 seconds (1.7 parts citric acid) |
| Storage stability (room temp. 72-77° F.) Viscosity Reading, cps/days | |
| 168/0 | 176/23 |
| 180/34 | 246/56 |
| 352/63 | Gel/77 |

EXAMPLE 5

MUF Resin Containing 2% Melamine

A. Two Stage Addition of the Melamine

Resin 5A was prepared to have an initial F/U mole ratio of 1.90:1; a final F/U mole ratio of 1.00:1; and a final F/U equivalent mole ratio of 0.97:1.

The reactor was charged with 2397.2 g. of 50% formaldehyde, 6.4 g. of triethanolamine, and 1261.8 g. of urea. When the urea was completely dissolved, the pH was 7.5. At that point melamine, 50.0 g., was added with very rapid agitation, and heating. When the melamine had completely dissolved, the pH was 7.6. Heating was continued to reflux, and the reaction mixture was heated at reflux for 15 minutes.

At that point the pH was adjusted to 6.2-6.4 by the addition of 2.5 g. of 30% formic acid. The reaction mixture was then heated at 84°-87° C. to attain a Gardner viscosity of N/O. The reaction mixture was permitted to cool slightly as the desired viscosity was approached. After the desired viscosity had been obtained, 1.7 g. of triethylamine was added to adjust the pH to 7.3–7.4, and then 50.0 g. of melamine were added with rapid agitation. Stirring was continued for about 10 minutes at 66°–70° C. to insure complete dissolution of the melamine.

Finally, 98.0 g. of salt, 1135.5 g. of urea, and 0.5 g. of triethylamine were added. After complete dissolution of the urea, the recovered product amounted to 4973 g. The physical properties are reported in Table 5-1 below.

Resin 5A was cured with citric acid. It performed well. Relative to the control resin, the reduction in formaldehyde emission was about 60% to 68%. The storage life appeared promising, and upon evaluation as a particleboard binder, satisfactory internal bond strength was obtained.

B. Single Stage Addition of the Melamine

Resin 5B was prepared to have an initial F/U ratio of 1.94:1; a final F/U ratio of 1.01:1; and a final F/Ueq ratio of 0.98:1. The technique used to produce the resin was essentially similar to that used for resin 5A, with the exception that all of the melamine, 100.0 g., was added at a single time, immediately after the initial addition of urea to the reactor. The physical properties of Resin 5B are also summarized in Table 5-1 below.

TABLE 5-1

Physical Properties of Resins 5A and 5B

| Resin | 5A | 5B |
|---|---|---|
| pH @ 25° C. | 7.8 | 8.0 |
| Viscosity (RVF, 1/20/25° C.) | 198 cps | 168 cps |
| Sp. Gravity (25/25° C.) | 1.283 | 1.281 |
| Gel Time, G.E. (121° C.) | 11.5 minutes | 11.2 minutes |
| Total Solids | 65.5% | 64.7% |
| BWG Time (100° C.) | 80 seconds (1.5 parts citric acid) | 78 seconds (1.4 parts citric acid) |

Storage Stability (room temp. 72–77° F., viscosity reading, cps/days)

| 5A | 5B | 5A | 5B |
|---|---|---|---|
| 198/0 | 168/0 | 266/31 | 204/35 |
| 404/50 | 301/57 | 726/57 | 480/64 |

Resin 5B was formulated for evaluation as a particleboard binder and was cured with citric acid. On the basis of the evaluation as a binder, it was concluded that the resin internal bond strength appeared to be satisfactory, but that the reduction in formaldehyde emission was only 36% as compared to the control. The reduction in formaldehyde emission obtained with resin 5A was superior.

EXAMPLE 6A

MUF Resin, 4% Melamine, Single Stage Addition

In this demonstration of the production of a resin suitable for use as a particleboard adhesive, the resin is made up to have an initial F/U molar ratio of 2.02:1; a final F/U molar ratio of 1.03:1; and a final F/Ueq. molar ratio of 0.97:1.

The reactor was charged with 2441.7 g. of a 50% formaldehyde solution, 7.2 g. of triethanolamine, and 1210.9 g. of urea. Upon complete dissolution of the urea, the pH was found to be 7.5. With maximum agitation, 208.0 g. of melamine and 86.0 g. of water were added, with heating. The pH was noted to be 7.8 after complete dissolution of the melamine. Heating was continued to reflux temperature, and refluxing was continued for 10 minutes.

The pH was then adjusted to about 6.4 by the addition of 4.5 g. of 30% formic acid. The temperature was then maintained at 81°–83° C. until a Gardner viscosity of N/O was attained. As the viscosity neared that value, the temperature was permitted to drop off slightly. After the viscosity had been attained, the pH was adjusted by the addition of 3.4 g. of triethylamine, and then 99.8 g. of salt and 1156.6 g. of urea were added. After complete dissolution of the urea, the recovered product amounted to 5201 g. The physical properties of the product are reported in Table 6-1 below:

TABLE 6-1

| Physical Properties of Resin 6A | |
|---|---|
| pH @ 25° C. | 7.9 |
| Viscosity (RVF 1/20/25° C.) | 144 cps |
| Sp. Gravity (25/25° C.) | 1.278 |
| Gel Time, G.E. (121° C.) | 11.0 minutes |
| Total Solids | 64.3% |
| BWG Time (100° C.) | 75 sec. (1.3 parts citric acid) |
| Storage Stability, Viscosity Reading, cps/days (r.t.): | |
| 147/10 165/36 560/77 | |

EXAMPLE 6B

For comparison, another resin was made up to have an initial F/U molar ratio of 1.93:1, a final F/U molar ratio of 0.87:1, and a final F/Ueq molar ratio of 0.82.

To make this resin, the reactor was charged with 2451.8 g. of a 50% solution of formaldehyde, 5.4 g. of triethanolamine, and 1270.9 g. of urea, to attain a pH of 7.4. With rapid agitation, 224.0 g. of melamine and 240.0 g. of water were added with heating. After dissolution of the melamine, the pH was 7.7. Heating was continued to reflux, then reflux was continued for 10 minutes.

The pH was then adjusted to 6.4 by adding 3.5 g. of 30% formic acid. Heating was then continued to maintain the temperature at 82°–84° C. to attain a Gardner viscosity of N/O. The temperature was permitted to drop of a few degrees as the desired viscosity was approached. After achieving the desired viscosity, the pH was adjusted by the addition of 4.2 g. of triethylamine, and then 110.0 g. of salt, 1563.3 g. of urea, and 25.0 g. of magnesium chloride were added. Upon dissolution of these materials, the recovered product amounted to 5885 g.

The physical properties of this resin solution are reported in Table 6-2 below, and its evaluation as a particleboard binder is described in Table 6-3, using an ammonium sulfate scavenger:

TABLE 6-2

| Physical Properties of Resin 6B | | | |
|---|---|---|---|
| pH @ 25° C. | 8.4 | | |
| Viscosity (RVF 1/20/25° C.) | 122 cps | | |
| Sp. Gravity (25/25° C.) | 1.274 | | |
| Gel Time, G.E. (121° C.) | 12.0 minutes | | |
| Total Solids | 63.9% | | |
| BWG Time (100° C.) | 82 sec. (Comb. of 1.5 parts Am. Sulfate and 2.0 parts Al Sulfate) | | |
| Storage Stability, Viscosity Reading, cps/days: | | | |
| Stored at 74° F.: | 142/1 | 128/9 | 138/19 |
| Stored at 90° F.: | 88/1 | 98/9 | 130/14 |
| | | 288/16 | Gel/19 |
| Stored at 110° F.: | 44/1 | 68/2 | Gel/5 |

TABLE 6-3

Evaluation of Resins 6A and 6B as Particleboard Binders

| Resin | Curing Agent (Parts 100 pts liquid resin at 65% solids) | % Mix Application (cure temp. °F.) | Emission ppm | Emission % Reduced Compared to Control | I.B. - Original 3.75 min./ 340 or 360° (24 hr. tests) |
|---|---|---|---|---|---|
| 6A | Citric Acid (1.2) | 8 (340°) | 0.6–0.8 | 50% | 164 |
| 6B | Am. Sulf. (0) | 7 (360°) | 0.1 | 83% | 148 |
|  | (0.75) | 7 (360°) | 0.1 | 83% | 132 |
|  | (1.5) | 7 (360°) | 0.1 | 83% | 137 |

EXAMPLE 7A

MUF Resin Containing 8% Melamine Added in a Single Stage

This resin was prepared to have an initial F/U molar ratio of 2.20:1, a final F/U molar ratio of 1.04:1, and a final F/Ueq molar ratio of 0.92:1.

This resin was prepared by charging to the reactor 2521.4 g. of a 50% formaldehyde solution, 5.0 g. of triethanolamine, and 1145.6 g. of urea. Upon dissolution of the urea, the pH was 7.7 With good agitation, 419.1 g. of melamine and 120.0 g. of water were added, with heating. After complete dissolution of the melamine, the pH was 7.9. The reaction mixture was heated to reflux, and maintained at reflux for 6 minutes with agitation.

After that, the batch began cooling. Then the pH was adjusted to 7.0–7.2 by adding 1.9 g. of 30% formic acid. The reaction mixture was then heated at 72°–74° C. until a Gardner viscosity of N/O was attained. The temperature was permitted to drop off a few degrees as the desired viscosity was approached.

After the desired viscosity was reached, 3.7 g. of triethylamine, 105.6 g. of salt, 1291.5 g. of urea, and 24.1 g. of magnesium chloride were added and the contents of the reactor were mixed for uniformity. The recovered product amounted to 5625 g. of a resin composition that had the physical properties described in Table 7-1 below:

TABLE 7-1

| Physical Properties of Resin 7A | |
|---|---|
| pH @ 25° C. | 8.8 |
| Viscosity (RVF 1/20/25° C.) | 113 cps |
| Sp. Gravity (25/25° C.) | 1.282 |
| Gel Time, G.E. (121°0 C.) | 11.7 minutes |
| Total Solids | 65.0% |
| BWG Time (100° C.) | 120 sec. (3.0 parts Am. Sulfate) |

Storage Stability, Viscosity Reading, cps/days:
Stored at 74° F.: 135/1  128/9  138/22  144/32  166/42
Stored at 90° F.: 75/1  90/7  494/14  938/16  1330/18
Stored at 110° F.: 57/1  58/2  Gel/7

This resin was evaluated as a particleboard binder using ammonium sulfate as the scavenger/curing agent, at levels of 0, 1.5, 3.0, and 4.0 parts per 100 parts of resin solids, dry basis. The emission rates at these levels were, respectively, 0.4 ppm, 0.3 ppm, 0.2 ppm and 0.2 ppm. The percentages of reduction as compared to the control resin were, respectively, 40%, 50%, 70% and 70%. In all cases, the internal bond strength was satisfactory.

In repetitions of this demonstration of the invention using greater and lesser amounts of urea as post-condensation additions, emissions were increased as the amount of urea was decreased, while emissions were decreased or held constant when the amount of urea was increased. The internal bond strengths were satisfactory.

EXAMPLE 7B

In a twelve-liter four-neck round-bottom flask equipped with a mechanical stirrer, 5631 g. of 50% formaldehyde was charged and the pH was adjusted to 7.0~7.2 with 10.9 g. triethanolamine. 2558.7 g. of prilled urea were charged and mixed. As soon as the urea dissolved (pH=7.4~7.8), 936 g. of melamine were charged at a temperature ≦37° C., followed by 294 g. of water. The mixture was heated to reflux for 6 minutes.

After the 6 minute reflux, the batch temperature was cooled to 70°–74° C. and the pH was adjusted to 7.0–7.2 with 3.6 g. of 30% formic acid. The reaction mixture was condensed to a Garnder viscosity reading of M/N at pH=7.0~7.2 and temperature=70°–74° C. When target viscosity was reached, the reaction was quenched and the pH adjusted to 7.3–7.5 with 3 g. of triethylamine while the batch temperature was cooled to 50°–54° C. Then 2259.4 g. of prilled urea were charged folllowed by 235.8 g. of sodium chloride. Finally, 53.8 g. of magnesium chloride hexahydrate were charged and the pH of the product was adjusted to 7.8–8.0. The liquid resin product had properties indicating that it would be suitable for use as a particleboard adhesive, with a very low emission level, good internal bond strength, and good storage characteristics.

EXAMPLE 8

Low Level Melamine Additions

To make two low level melamine modified liquid resin products, 8A and 8B respectively, the amounts of urea and melamine shown respectively in Table 8-1 below were used. The urea was charged to a reaction flask. Then 792.8 g. of 50% formaldehyde were charged into the flask and the pH was adjusted to 7.2±0.2. The mixture was heated to reflux for 30 minutes. After reflux, the pH was adjusted to 5.8±0.2 with 30% formic acid for condensation to proceed. Melamine was added right after this pH adjustment. The condensation was carried on at pH 6.0±0.2 until a Gardner viscosity "G/H" was reached.

The reaction mixture was then neutralized and the pH was adjusted to 7.8±0.2 with triethylamine. It was then vacuum distilled to a specific gravity of 1.268±0.004. The second portion of urea (248.6 g.) was then charged and the pH of the final product was adjusted to 8.0±0.2. The solids content was approximately 67±1%.

TABLE 8-1

| | Amounts Used, g. | |
|---|---|---|
| | Ex. 8A | Ex. 8B |
| Prilled Urea | 609.0 | 609.0 |
| Crystal Melamine | 14.5 | 3.0 |
| Resin product recovered | 1313 | 1292.6 |

The molar ratios and % melamine were as in Table 8-2 below:

TABLE 8-2

| | Ex. 8A | Ex. 8B |
|---|---|---|
| F/U initial | 2.2:1 | 2.2:1 |
| F/U final | 1.3:1 | 1.3:1 |
| F/Ueq final | 1.28:1 | 1.30:1 |

TABLE 8-2-continued

|  | Ex. 8A | Ex. 8B |
|---|---|---|
| % Melamine | 1.1% | 0.2% |

When these liquid resin products were used as binders for particleboard, the internal bond strengths were acceptable. Formaldehyde emission, ppm, by the 2 hour dessicator test, in each case was 1.2 ppm.

GENERAL

Several different resin formulations can be used as particleboard binders. Phenol-formaldehyde resins have low formaldehyde emission levels, compared in general to the urea-formaldehyde resins. However, the phenol-formaldehyde resins are much more expensive. The addition of melamine to a urea-formaldehyde resin tends to increase its cost, while affecting other properties in a variety of ways. For a substantial reduction in formaldehyde emission, the amount of melamine incorporated into a urea-formaldehyde resin preferably is at least 2% added in two stages, or at least 4% added in a single stage.

For good stability of an MUF resin, it should be made up to a pH above about 7.7, and preferably, above 9. A more preferred pH value to insure good storage stability is 9.4 or higher, at an 8% melamine addition level.

One preferred particleboard binder formulation can be made up from an MUF resin containing about 4% by weight of melamine (based on liquid resin at 65% solids), added in a single stage, as in Example 2. The resin employed may have, for example, an F/Ueq ratio of 0.85:1. When used as a binder for particleboard, the level of formaldehyde emission is so low that it is close to background. With a formulation of this kind, no external catalyst is required.

With a 4% melamine MUF liquid resin product having an F/Ueq molar ratio of 0.82–0.85:1, formulations containing a scavenger substance generally are characterized by formaldehyde emissions of 0.1 or less, very low values, comparable to or lower than emissions from phenolic resins. Storage lives generally are acceptable.

Other preferred formulations are based upon resins prepared with 8% melamine incorporation based on liquid resin at 65% solids, and an F/U equivalent ratio very close to 1.00:1, such as, for example, 1.03:1. Generally MUF resins containing up to 8% melamine are characterized by acceptable storage lives. The incorporation of less melamine than 8% in a liquid resin tends to increase storage life. When the amount of melamine incorporation in a liquid resin is in the range from about 4% to 8%, properly cured internal bonds are usually better than those obtained with comparable commercial urea-formaldehyde resins of similar F/U molar ratios.

The optimum amount of scavenger/curing agent to be used with any particular resin can be determined readily for a particular set of operating conditions by a few simple trials. In such a trial, the level of addition of melamine to a particular UF resin is adjusted to achieve an optimum balance of bond strength, emission level, storage stability, cost, and other properties.

For optimum reduction in formaldehyde emission, with MUF liquid resins incorporating melamine in the 4% to 8% range, good press temperatures are from about 340°–360° F. No benefit appears to be observed when the curing temperature is 400° F., for example, as compared with 360° F. A good laboratory curing time appears to be from about 3.5 minutes to about 4.5 minutes. Extended press times tend to result in lower emissions, but affect bond strengths.

Emission levels are closely related to F/U equivalent ratios. With 8% melamine incorporation and a fairly low ration resin, that is, F/Ueq equal to 1.0:1, and with only acid catalysis (magnesium chloride), the levels of emissions observed ordinarily will be slightly lower than those of comparable ratio F/U resins. However, when such resins are cured with from 3 to 4 parts of an external curing agent/scavenger such as ammonium sulfate, the resins are cured ordinarily will be characterized by substantially lower levels of emissions than those of similarly cured, comparable or higher ratio F/U resins. Moreover, because of melamine cross-linking, the bond quality in the scavenged systems tend to be superior to those produced by comparable or somewhat higher ratio F/U resins.

At unusually low ratios, i.e. F/U equivalent equal to 0.85:1, satisfactory resin and particleboard properties can be obtained at very low levels of melamine incorporation, without external catalysis, and emissions ordinarily are close to room background, that is, about 0.1 ppm.

As a specific example of emission reduction, in addition to those in the detailed demonstrations of the invention above, a resin was prepared having an F/Ueq ratio of 1.03:1, having an 8% melamine content on liquid resin at 65% solids. When curing with 3 parts of ammonium sulfate for each 100 parts of liquid resin, the emission level as determined by the two hour dessicator test was 0.2 ppm, using particleboard produced in the laboratory by pressing at 360° F. for 4 minutes. For comparative purposes, commercially available phenolic resins tend to have emissions of from about 0.1 ppm to 0.2 ppm. The control F/U resin employed in the specific detailed demonstrations above, having an F/U final molar ratio of 1.17:1, had its lowest emissions at 0.4 ppm, with an internal bond strength that was less than desirable.

After an MUF resin according to the invention has been used, the equipment should be cleaned. For MUF resins having a melamine content of 8%, clean up can be done by displacement using a normal F/U resin, or by washing with either a 25% urea solution or a 10% sodium hydroxide solution. MUF resins containing only 4% melamine are easier to clean up, hot water often being adequate.

As another specific example of emissions level, an MUF resin having a molar ratio of F/Ueq. of 0.85:1 and containing 4% melamine produces emissions that are very close to background and that are about 50% lower than those of the 8% melamine MUF resin just described above. For this 4% melamine resin, no external catalyst is required. The internal bond strengths obtained may be slightly below those for the 8% melamine MUF resin described above and cured with 3 parts of ammonium sulfate per 100 parts of liquid resin.

Reverting now to the 8% melamine content MUF resin, instead of curing with 3 parts ammonium sulfate per 100 parts of liquid resin, 10 parts of urea may be used per 100 parts of resin. This added amount of urea functions as a scavenger and is added after the polymerization reaction has been completed using mole ratios ordinarily used. The added urea will produce emissions close to background and generally substantially lower, that is often 50% lower, than those observed when 3 parts of ammonium sulfate is used, while internal bond strength is substantially the same.

In evaluating any particular resin formulation for use as a particleboard binder, there are many different parameters that must be kept in mind. To demonstrate this, the following comments apply to MUF resins having a melamine content of 4%, but a different final F/Ueq ratios.

MUF Resins Containing 4% Melamine

When the final F/Ueq molar ratio is about 1.10:1, and the resin formulation is cured using 4 parts ammonium sulfate, emissions appear to be very close to those obtained with a low ratio F/U resin, final F/U equal 1.05:1. The reduction in emissions is substantial, about 40% as compared to those of the control resin.

At a final F/Ueq ratio of 0.95:1, best results in terms of emissions reduction are obtained at 0–1.5 parts of ammonium sulfate. Emissions observed were 0.2–0.3 ppm, with in some cases moderate to good internal bond strengths, that is, 126–131. Storage lives appear to be acceptable. Bond strengths appear to be affected by the amount of resin applied to the furnish.

When the final F/Ueq molar ratio was in the range from 0.82:1 to 0.85:1, which was unusually low ratios, the resin after curing generated an emission level of 0.1 ppm. Such resins appeared to produce boards having essentially the same properties, and all seem to cure well without the use of external catalysts. Storage lives were in the range from about 9 weeks at room temperature to about two weeks at 90° F.

MUF Resin Containing 8% Melamine

An 8% melamine-containing MUF resin having a final F/Ueq molar ratio of 0.90:1 to 1.03:1 will generate emissions of about 0.2 ppm. Often the storage life for such a resin is marginal for commercial applications, although subject to prolongation by pH adjustment to a high numerical value, that is, above 7.7, preferably above 9.0, and most preferably, 9.4 or even higher. At present, there appears to be no observable advantage with such a resin to moving the final F/Ueq ratio from 1.03:1 to 0.92:1, or in increasing the initial F/U molar ratio from 2.2:1 to 2.4:1.

CONCLUSION

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for adhesively securing a first item to a second using a curable melamine-urea-formaldehyde base resin, comprising
    disposing between a first item and a second item a binding amount upon curing of a curable melamine-urea-formaldehyde base resin comprising a melamine-urea-formaldehyde condensate that has a final molar ratio of formaldehyde to urea of 1.3:1 to 0.9:1, a final molar ratio of a formaldehyde to urea-equivalent of 1.3:1 to 0.7:1, and a melamine content of from 0.15% to 40% by weight of said condensate, dry solids basis, the melamine being incorporated in the resin, wherein said condensate is formed from an initial reaction mixture comprising urea and formaldehyde and having a molar ratio of formaldehyde to urea of from 3:1 to 1:1, that has undergone a methylolation reaction at an alkaline pH, been adjusted in pH to 6.0 to 8.3, had any remaining amount of urea and melamine added, then been condensed,
    then curing said resin, said cured resin being characterized by a formaldehyde emission, as determined by the two hour desiccator procedure of the National Particleboard Association, not in excess of about 0.4 micrograms per ml.

2. The process of claim 1, wherein said initial reaction mixture comprises at least some of the melamine.

3. The process of claim 1 for bonding lignocellulosic material, wherein said condensate is formed from an initial reaction mixture having a molar ratio of formaldehyde to urea of from about 2.2:1 to about 2.0 to 1, and having a melamine content of at least 1%.

4. The process of claim 3 wherein said melamine content is from 3% to about 6% and a part of said melamine is added for said methylolation reaction and a part is added for a subsequent condensation reaction.

5. The process of claim 3 wherein said base resin is in the form of an aqueous formulation comprising an aqueous vehicle in which said resin is carried, said formulation having a solids content of from about 45% to about 70%, and a viscosity in the range 60–800, as measured at 25° C.

6. The process of claim 5 wherein said resin is applied with an amount of a scavenger substance that is capable of reacting with formaldehyde, the amount being sufficient to reduce the level of formaldehyde emission in the cured resin.

7. The process of claim 1 wherein said melamine content is from 0.5% through 12%, inclusive, liquid basis.

8. A process for making particleboard by applying to a furnish a curable melamine-urea-formaldehyde resin binder formulation in an aqueous vehicle having a pH above 7.0, said resin comprising a melamine-urea-formaldehyde condensate that has a final molar ratio of formaldehyde to urea of 1.3:1 to 0.9:1, a final molar ratio of formaldehyde to urea-equivalent of 1.3:1 to 0.7:1, and a melamine content of from 3% to 6% by weight of said condensate, based on liquid resin weight at 65% solids, the melamine being incorporated in the resin, wherein said condensate is formed from an initial reaction mixture comprising urea and formaldehyde and including at least some of the melamine and having a molar ratio of formaldehyde to urea of from 2.2:1 to 2.0:1, that has undergone a methylolation reaction at an alkaline pH, been adjusted in pH to 6.0 to 8.3, had any remaining amount of urea and melamine added, then been condensed, said formulation having a solids content of from about 45% to about 70%, a viscosity in the range 60–800 cps, at 25° C.,
    then bonding said furnish and applied binder formulation under heat and pressure and curing said resin binder,
    said finished particleboard being characterized by a formaldehyde emission, as determined by the two hour desiccator procedure of the National Particleboard Association, not in excess of about 0.4 micrograms per ml.

9. The process of claim 8 wherein said formulation comprises an amount of a scavenger substance that is capable of reacting with formaldehyde, the amount being sufficient to reduce the level of formaldehyde emission in the finished particleboard.

10. An improved pressed composite of lignocellulosic material bound together by a cured resin binder, which composite is characterized by reduced emission of formaldehyde, wherein said binder as applied to said lignocellulosic material comprises a curable melamine-urea-formaldehyde base resin that is formed from the methylolation reaction at an alkaline pH of an initial reaction mixture comprising urea and formaldehyde and having a formaldehyde to urea initial molar ratio of 2.2:1 to 2.0:1, that has undergone a methylolation reaction at an alkaline pH, been adjusted in pH to 6.0 to 8.3, had any remaining amount of urea and melamine added, then undergone a condensation reaction to produce a condensate that has a final molar ratio of formaldehyde to urea of 1.3:1 to 0.9:1, a final molar ratio of formaldehyde to urea-equivalent of 1.3:1 to 0.7:1, and a melamine content of from about 0.15% to about 40% by weight of said condensate, dry solids basis, the melamine being incorporated in the resin.

11. The composite of claim 10, said initial reaction mixture comprising at least some melamine.

12. The composite of claim 11 wherein said resin binder comprises an amount of a scavenger that is capable of reacting with formaldehyde, said amount being sufficient to reduce the level of formaldehyde emission in the cured resin.

13. The composite of claim 12 wherein said scavenger substance is an amount of urea added following condensation of said resin, the amount of urea being in the range up to 25% by weight of the resin solids, dry basis.

14. The composite of claim 11 wherein a part of said melamine is added for the methylolation reaction and a part of said melamine is added for the subsequent condensation reaction.

15. The composite of claim 11 wherein said melamine content is from 1% to 2%.

16. The composite of claim 10 wherein said methylolation reaction is caused to occur with an initial reaction mixture that includes at least some of said melamine and that has an initial molar ratio of formaldehyde to urea of from about 2.2:1 to about 2.0:1.

17. A melamine-urea-formaldehyde resin composition that is characterized by a pH above 7.0 and by a low rate of formaldehyde emission when fully cured, comprising, a melamine-urea-formaldehyde condensate that has a final molar ratio of formaldehyde to urea of 1.3:1 to 0.9:1, a final molar ratio of formaldehyde to urea-equivalent of 1.3:1 to 0.7:1, and a melamine content of from 0.15% to 40% by weight of said condensate, dry solids basis, the melamine being incorporated in the resin, wherein said condensate is formed from an initial reaction mixture comprising urea and formaldehyde and having a molar ratio of formaldehyde to urea of from 3:1 to 1:1, which initial reaction mixture has undergone a methylolation reaction at an alkaline pH, been adjusted in pH to 6.0 to 8.3, had any remaining amount of urea and melamine added, then been condensed.

18. The composition of claim 17 wherein said initial reaction mixture comprises at least some of said melamine.

19. The composition of claim 17 wherein said condensate is formed from an initial reaction mixture having a molar ratio of formaldehyde to urea of from about 2.2:1 to about 2.0:1.

20. The composition of claim 19 wherein said initial reaction mixture comprises at least some of said melamine.

21. The composition of claim 20 formulated in an aqueous vehicle for said resin, having a pH of 7.0 or higher.

22. The aqueous resin formulation of claim 21 comprising an amount of a scavenger substance that reduces formaldehyde emission in the cured resin, wherein said resin is dissolved in said aqueous vehicle, said formulation having a solids content of 45% to 70% and a viscosity in the range 60–800 cps as measured at 25° C.

23. The formulation of claim 22 wherein the final molar ratio of formaldehyde to urea equivalent is from 1.03:1 to 0.82:1.

24. The formulation of claim 22 wherein said melamine content is from 3% through 6%, inclusive.

25. The composition of claim 17 comprising an amount of a scavenger substance that is capable of reacting with formaldehyde, said amount being sufficient to reduce the level of formaldehyde emission in the cured resin.

26. A resin composition in accordance with claim 25 wherein said scavenger substances comprises up to 25% by weight of said condensate, dry basis, of urea added to said preformed condensate.

27. The composition of claim 25 comprising an aqueous vehicle for said resin and scavenger, having a pH of 7.0 or higher.

28. The aqueous composition of claim 27 that is suitable for use as a binder for particleboard wherein said melamine content is from about 3% to about 12%, said resin is dissolved in said aqueous vehicle, said formulation having a solids content from about 60% to about 70%, and a Brookfield viscosity not above about 800 cps as measured at 25° C.

29. A resin composition in accordance with claim 17 wherein said composition is suitable for use as a particleboard binder, wherein a part of the melamine is added for the methylolation reaction and a part of the melamine is added for a subsequent condensation reaction.

30. The composition of claim 29, said composition being curable to a cross-linked state in which the residual formaldehyde as determined by the two hour desiccator procedure of the National Particleboard Association is 0.4 micrograms per ml. or less.

31. The resin composition of claim 17 formulated in an aqueous vehicle for use as a particleboard binder, wherein said condensate is formed from an initial reaction mixture comprising melamine, urea and formaldehyde and having a molar ratio of formaldehyde to urea of from 2.2:1 to 2.0 to 1, and said condensate has a final molar ratio of formaldehyde to urea equivalent of from 1.03:1 to 0.82:1, and a melamine content from 3% to 6%, and wherein said formulation comprises a scavenger substance in an amount that reduces formaldehyde emission in the cured resin, said formulation having a pH of 7.0 or higher, a solids content of 60% to 70%, and a viscosity of 60 to 800 cps at 25° C.

32. A process for making a curable resin characterized by a reduced emission level of formaldehyde from the cured resin, comprising:

reacting urea and formaldehyde at an initial molar F/U ratio in the range from 3:1 to 1:1, under conditions that cause methylolation to occur at an alkaline pH, adjusting the pH to from about 6.0 to about 8.3, adding any remaining amount of urea to a final F/U molar ratio of from 1.3:1 to 0.9:1, and condensing, and in said process, prior to condensing the reaction mixture, adding melamine in an amount of from about 0.15% to about 40% by weight of the condensate, dry solids basis, the melamine being incorporated in the resin, to attain a final F/U equivalent ratio of from 1.3:1 to 0.7:1.

33. The process of claim 32 wherein at least a part of the melamine is added to the initial reaction mixture.

34. The process of claim 33 wherein a scavenger substance is incorporated in the liquid resin product in an amount that reduces formaldehyde emission in the cured resin.

35. The process of claim 33 wherein the final F/U molar ratio is from 1.03:1 to 0.82:1.

36. The process of claim 33 wherein the amount of melamine added is from about 3% to about 12%.

* * * * *